United States Patent Office 3,799,977
Patented Mar. 26, 1974

3,799,977
OXIDATION OF GLYCOLS
Thomas F. Rutledge, Wilmington, Del., assignor to ICI America Inc., Wilmington, Del.
No Drawing. Filed Jan. 28, 1972, Ser. No. 221,801
Int. Cl. C07c 51/26, 53/22
U.S. Cl. 260—531 R          3 Claims

ABSTRACT OF THE DISCLOSURE

Process for preparing monocarboxylic acids from glycols whereby the formation of monocarboxylic acid is favored and the formation of dicarboxylic acid is substantially suppressed. The process comprises oxidizing neopentyl glycol, ethylene glycol, and polyethylene glycols containing from 2 to 8 ethylene glycol units, to the corresponding monocarboxylic acid, in the presence of an oxygen containing gas and a supported platinum metal oxidation catalyst, while adding a suitable base to maintain the pH of the reaction mixture within the range of 6.5 to 9.

---

This invention relates to a process for the preparation of monocarboxylic acids. More particularly, this invention relates to an improved process for the preparation of monohydroxy monocarboxylic acids by the catalytic oxidation of glycols.

The preparation of carboxylic acids by the catalytic oxidation of hydroxyl containing organic compounds is well known in the prior art. While many satisfactory processes are known for the oxidation of monohydric alcohols to the corresponding carboxylic acid, these processes have not been satisfactory when applied to the preparation of monocarboxylic acids by the catalytic oxidation of glycols. The use of such processes to oxidize glycols has not been satisfactory because they result in the oxidation of both hydroxyl groups to form dicarboxylic acids, or at best, these processes result in the formation of a mixture of dicarboxylic acid and a small amount of monocarboxylic acid. Processes for the oxidation of glycols are also known in the prior art as shown by Heyns and Blazejewicz, Tetrahedron 9, 67–75 (1960). These prior art processes have not been satisfactory because they result in low yields of the monocarboxylic acid or in the formation of substantial amounts of dicarboxylic acids. It would be highly desirable to provide a simple, economical, and efficient method for preparing monohydroxy monocarboxylic acids by the selected oxidation of only one hydroxyl group of a glycol.

Accordingly, it is an object of the present invention to provide a novel and improved process for preparing monohydroxy monocarboxylic acids. Another object of this invention is to provide a process for the selective oxidation of glycols whereby only one of the hydroxyl groups present in the glycol is oxidized to a carboxyl group. Another object of this invention is to minimize formation of dicarboxylic acids during the oxidation of glycols. Another object is to provide a simple, economical, efficient and commercially attractive process for preparing monocarboxylic acids containing one free hydroxyl group by the catalytic oxidation of glycols.

The foregoing objects and still further objects of this invention are broadly accomplished by providing an improved process for the preparation of monocarboxylic acid from a glycol selected from the group consisting of neopentyl glycol, ethylene glycol and polyethylene glycols containing from 2 to 8 ethylene glycol units, whereby one of the hydroxyl groups of the glycol is oxidized to a carboxyl group and the other hydroxyl group of the glycol is left unmodified, which process comprises oxidizing the glycol in the presence of an oxygen containing gas and a supported platinum metal catalyst while maintaining the pH of the reaction mixture within the range of 6.5 to 9. It has been discovered in accordance with the present invention that in the catalytic oxidation of neopentyl glycol, ethylene glycol or polyethylene glycols containing from 2 to 8 glycol units to the corresponding monocarboxylic acid, improved yields of the monocarboxylic acid may be obtained and the formation of dicarboxylic acid substantially suppressed by maintaining the pH of the reaction solution from 6.5 to 9.

In carrying out the process of the present invention it is essential that the pH of the reaction mixture be maintained throughout the course of the reaction at a value from 6.5 to 9. It has been found quite unexpectedly that if the pH of the reaction mixture is allowed to increase above 9, the ratio of monocarboxylic acid to dicarboxylic acid starts to decrease rapidly. The yield of monocarboxylic acid decrease rapidly at pH values below 6.5. Accordingly, in order to obtain the highest yields of the corresponding monocarboxylic acid and to suppress the formation of the corresponding dicarboxylic acid, the pH must be maintained within a range from about 6.5 to 9, and preferably below 9, throughout the entire course of the oxidation reaction. The pH of the reaction mixture may be maintained from 6.5 to 9 by any convenient means. A preferred means comprises adding alkaline material to the reaction mixture during the course of the oxidation reaction to maintain the pH from 6.5 to 9. A preferred class of alkaline material are the metal hydroxides, including the alkali and alkaline earth metal hydroxides. A preferred hydroxide is sodium hydroxde.

The catalyst employed in the oxidation process of the present invention may be any of the platinum metal catalysts which are conventionally used in the art for the catalytic oxidation of alcohols to carboxylic acids. The platinum catalysts may be supported on an inert catalyst carrier material which provides a sufficiently large surface area for the platinum deposited thereon. Illustrative examples of such well known catalysts support are finely divided carbon, silica and kieselguhr. The amount of platinum supported on the carrier is not critical and is usually from 1% to 15%, and preferably about 3% to 10%, of platinum based on the total weight of catalyst.

The amount of supported platinum catalyst employed in the process of the present invention should be that amount which is sufficient to provide a catalytic effect. In most cases, the amount of catalyst used is from 0.2 gram of supported catalyst per 100 millimols of glycol to 1 gram of supported catalyst per gram of glycol. It will be understood, of course, that smaller and larger amounts of catalyst may be used if desired.

The catalyst may be employed in the form of a stationary bed positioned in a suitable reaction zone providing for intimate contact between reactants and catalysts. Suitable reaction zones may comprise one or more chambers of enlarged cross-sectional area, reaction zones of restricted cross-sectional areas, such as tubular reactors, or combinations thereof. The process particularly lends itself to being carried out with the catalyst slurried in an aqueous solution of the glycol.

The reaction is carried out at any temperature which gives a satisfactory rate of reaction and which does not result in a substantial amount of undesirable side reactions and may be any of the temperatures used in the art for the oxidation of hydroxy groups to carboxy groups. A particularly preferred temperature range is from 20 to 70° C.

With the exception of the pH of the reaction mixture, which must be maintained from 6.5 to 9, the reaction conditions, such as temperature, catalyst concentration, concentration of platinum on the carrier, nature of the carrier, etc., form no part of this invention and may be any of the reaction conditions which are used in the art for the oxidation of hydroxyl groups to carboxyl groups.

The following examples are illustrative of preferred processes of this invention. These examples are set forth solely for the purpose of illustration and any specific enumeration of details contained therein should not be interpreted as expressing limitations of this invention. It will be readily apparent to those skilled in the art that reaction conditions such as solvent, concentrations, catalysts, temperature, etc. may be altered for those recited in the following examples. All parts and percentages are by weight, unless otherwise stated.

EXAMPLE 1

The reactor employed is a cylindrical stirred vessel, fitted with a sintered glass disc for sparging oxygen gas in very fine bubbles through the stirred glycol solution-catalyst suspension. An external pump recirculates the oxygen, which is fed as needed from a burette by displacement with water. Oxygen pressure is 5 millimeters above atmospheric pressure. Sodium hydroxide is added from a burette through a long needle which extends into the reactor below the surface of the liquid. Temperature is controlled by a thermistor device.

6.2 grams of ethylene glycol is dissolved in 160 ml. of deionized water and 0.5 gram of a carbon supported platinum is added. The catalyst contains 5 weight percent of platinum based on the total weight of platinum and carbon. The glycol solution-catalyst suspension is placed in the reactor, and air is removed by flushing with oxygen for 45 minutes. The contents of the reactor are stirred and heated to 50° C. The oxygen pressure is maintained at 5 mm. above atmospheric and oxygen consumption is recorded at 5 minute intervals. The pH of the solution is maintained between 6.5 and 9 by continuously adding sodium hydroxide to maintain a sodium hydroxide/oxygen consumed ratio of 1.02 to 1.05 (mols). After 1.5 hours, the reaction product has consumed 93 millimols of sodium hydroxide and 97 millimols of oxygen (5 millimols of oxygen is consumed after base addition is stopped). The reaction product is then filtered and the filtrate has a pH of 8.6. The filtrate is then treated in accordance with the procedure outlined in Example 2.

EXAMPLE 2

Example 1 is repeated except that the amount of oxygen consumed is 96.4 millimols and the amount of sodium hydroxide employed is 96.5 millimols over a period of 1.66 hours. The pH of the filtrate is 8.5. This filtrate and the filtrate from Example 1 are combined and the pH adjusted to 4 by the addition of hydrochloric acid. The resulting solution is then evaporated to a volume of 180 milliliters and passed through a column of strong base ion exchange resin in the hydroxyl form (Dowex 21A). The first fraction of eluate, eluted with water, contains 7.9 grams of sodium glycolate (91 millimols), identified by infrared analysis. The second fraction of eluate, eluted with dilute hydrochloric acid, contains 7 grams of glycolic acid (92 millimols). The total conversion to glycolic acid is 87%.

EXAMPLE 3

53 grams of diethylene glycol, 3.8 grams of a 5% platinum supported on finely divided carbon catalyst (1.9 grams dry basis), and 270 milliliters of deionized water are charged to the reactor described in Example 1. Air is removed by flushing the reactor with oxygen for 45 minutes. The reactor is then closed and heated to 40° C. over a 10 minute period. A 4.1 N sodium hydroxide solution is added to maintain the pH of the reaction mixture at 8.5 while oxygen is consumed. After 3.5 hours, oxygen consumption is 12.6 liters (562 millimols) and base consumption is 125 milliliters (513 millimols). Oxidation is still proceeding rapidly when the reaction is terminated by flushing the reaction with nitrogen and cooling the reaction mixture to room temperature. The catalyst is removed by filtering. The filtrate has a pH of 8.1. Analysis of an aliquot of the solution shows 0.14% $CO_2$, corresponding to 3 millimols of $CO_2$ per 100 millimols of diethylene glycol charged. The product solution is acidified to a pH of 5 with acetic acid to remove any dissolved carbon dioxide. An aliquot of this solution is then passed through a column of Dilex 50W–X–8, in hydrogen form, to remove sodium ions. The acidic column effluent is stirred at 50° C. to 55° C. and 2 to 5 milliliters of pressure to remove water and most of the acetic acid. The residue is a slightly viscous liquid, clear and colorless. The reaction product contains a substantial yield of beta-hydroxyethoxyacetic acid. Dicarboxylic acid is not detected in the reaction mixture.

EXAMPLE 4

31.3 grams of neopentyl glycol, 300 milliliters of deionized water, and 2 grams of a 5% platinum-carbon catalyst are placed in the reactor described in Example 1. Air is removed by purging with oxygen for 45 minutes. Temperature is then adjusted to 60° C., and 4.2 N sodium hydroxide solution is added to maintain a pH of 8.5. After reaction for 5 hours, oxygen consumption is 314 millimols and the sodium hydroxide consumption is 211 millimols. The catalyst is removed by filtration. The filtrate weighs 355.7 grams and analysis thereof indicates that neopentyl glycol had been converted to the monoacid of neopentyl glycol.

Additional examples showing the preparation of monocarboxylic acids of various glycols in accordance with the process of the present invention are shown in the following Table I. The reactor and reaction and process procedure employed in the following examples was identical to that employed in Example 1. The pH of the reaction mixture is maintained at a value from 6.5 to 9 during the oxidation reaction.

TABLE I

| Example Number | Glycol | Grams of— Glycol | Grams of— 5% Pt-carbon | Temperature, ° C. | Time | M mols of O | M mols of NaOH | Percent monoacid in product |
|---|---|---|---|---|---|---|---|---|
| 5 | Ethylene | 9.3 | 0.5 | 30 | 1½ | 150 | 135 | 80 |
| 6 | Triethylene | 28.1 | 1.9 | 50 | 3 | 329 | 331 | 97 |
| 7 | Tetraethylene | 36.4 | 1.95 | 60 | 1½ | 187.5 | 185.5 | 89 |
| 8 | Hexaethylene | 56.2 | 1.95 | 60 | 2 | 134 | 136 | (1) |

1 Amount of monoacid in product not determined.

The above examples and description are to be taken as only illustrative of the invention and a number of its preferred embodiments and it is to be understood that many further variations and modifications of the invention may be made by those skilled in the art without departing from the scope and spirit of the invention which is defined in the appended claims.

Having thus described the invention, what is desired to be secured by Letters Patent is:

1. In a process for the preparation of monohydroxy monocarboxylic acids by oxidizing a polyethylene glycol containing from 2 to 8 ethylene glycol units, in the presence of an oxygen containing gas and a supported platinum metal catalyst, the improvement which comprises maintaining the pH of the reaction mixtures within the range of 6.5 to 9.

2. A process of claim 1 wherein the pH of the reaction mixture is maintained within the range of 6.5 to 9 by adding a base to the reaction mixture during the course of the oxidation reaction.

3. The process of claim 2 wherein the base employed is sodium hydroxide.

References Cited
UNITED STATES PATENTS

| | | | |
|---|---|---|---|
| 3,342,858 | 9/1967 | Fuhrmann et al. | 260—531 R |
| 3,407,220 | 10/1968 | Williams et al. | 260—531 R |
| 3,595,909 | 7/1971 | Sheldon | 260—531 C X |

FOREIGN PATENTS

| | | | |
|---|---|---|---|
| 1,035,639 | 8/1958 | Germany | 260—531 R |

LORRAINE R. WEINBERGER, Primary Examiner

R. D. KELLY, Assistant Examiner

UNITED STATES PATENT OFFICE
CERTIFICATE OF CORRECTION

PATENT NO. : 3,799,977
DATED : March 26, 1974
INVENTOR(S) : Thomas F. Rutledge, Wilmington, DE It is certified that error appears in the above—identified patent and that said Letters Patent are hereby corrected as shown below:

Column 2, line 31, "hydroxde" should read -- hydroxide --.

Column 5, line 9, "mixtures" should read -- mixture --.

Signed and Sealed this second Day of December 1975

[SEAL]

Attest:

RUTH C. MASON
*Attesting Officer*

C. MARSHALL DANN
*Commissioner of Patents and Trademarks*